United States Patent
Takatsuka

(10) Patent No.: US 8,270,808 B2
(45) Date of Patent: Sep. 18, 2012

(54) CONTENT DATA RECORDING/REPRODUCING DEVICE, INFORMATION COMMUNICATION SYSTEM, CONTENTS LIST GENERATION METHOD AND PROGRAM

(75) Inventor: Susumu Takatsuka, Tokyo (JP)

(73) Assignee: Sony Corporation, Tokyo (JP)

( * ) Notice: Subject to any disclaimer, the term of this patent is extended or adjusted under 35 U.S.C. 154(b) by 1327 days.

(21) Appl. No.: 11/929,671

(22) Filed: Oct. 30, 2007

(65) Prior Publication Data
US 2008/0120341 A1 May 22, 2008

(30) Foreign Application Priority Data

Nov. 22, 2006 (JP) ................ P2006-315930

(51) Int. Cl.
*H04N 9/80* (2006.01)
(52) U.S. Cl. ......... 386/248; 386/280; 386/341; 386/230
(58) Field of Classification Search .............. 386/280, 386/341, 230, 248
See application file for complete search history.

(56) References Cited

U.S. PATENT DOCUMENTS

| | | | | |
|---|---|---|---|---|
| 2003/0212762 A1* | 11/2003 | Barnes et al. | ................ | 709/219 |
| 2004/0261093 A1* | 12/2004 | Rebaud et al. | .................. | 725/25 |
| 2005/0203853 A1* | 9/2005 | Yamamoto et al. | ............. | 705/59 |
| 2006/0233535 A1* | 10/2006 | Honda et al. | ................. | 386/112 |

FOREIGN PATENT DOCUMENTS

JP 2005-56343 3/2005

\* cited by examiner

*Primary Examiner* — Helen Shibru
(74) *Attorney, Agent, or Firm* — Finnegan, Henderson, Farabow, Garrett & Dunner, L.L.P.

(57) ABSTRACT

The present invention provides a content data recording/reproducing device, comprising a communication unit that engages in communication with an external device, a storage unit that stores content data and additional data related to the content data, a content data extraction unit that selectively extracts the content data from the storage unit based upon condition data received at the communication unit from the external device and the additional data stored in the storage unit and a contents list generation unit that generates a contents list based upon the condition data and additional data corresponding to the content data extracted by the content data extraction unit.

13 Claims, 11 Drawing Sheets

| No. | TRACK | ARTIST | GENRE | JACKET IMAGE |
|---|---|---|---|---|
| 1 | TRACK A | ARTIST A | JAPANESE R&B | 001.bmp |
| 2 | TRACK B | ARTIST B | JAPANESE R&B | 002.bmp |
| 3 | TRACK C | ARTIST C | JAPANESE R&B | |
| 4 | TRACK D | ARTIST D | JAPANESE R&B | |

| No. | TRACK | ARTIST | GENRE | JACKET IMAGE |
|---|---|---|---|---|
| 1 | TRACK A | ARTIST A | JAPANESE R&B | 001.bmp |
| 2 | TRACK B | ARTIST B | JAPANESE R&B | 002.bmp |
| 3 | TRACK C | ARTIST C | JAPANESE R&B | |
| 4 | TRACK D | ARTIST D | JAPANESE R&B | |

FIG.7A

| CONDITION DATA | CONTENT LIST (A, B, C, D) |

FIG.7B

| CONDITION DATA | CONTENT LIST (A, B, C, D) | CONTENT DATA A | CONTENT DATA B | CONTENT DATA C | CONTENT DATA D |

FIG.7C

| CONDITION DATA | CONTENT LIST (A, B, C, D) | CONTENT DATA A | CONTENT DATA B |

FIG.7D

| CONDITION DATA | CONTENT LIST (A, B, C, D) | PART OF CONTENT DATA A | PART OF CONTENT DATA B | PART OF CONTENT DATA C | PART OF CONTENT DATA D |

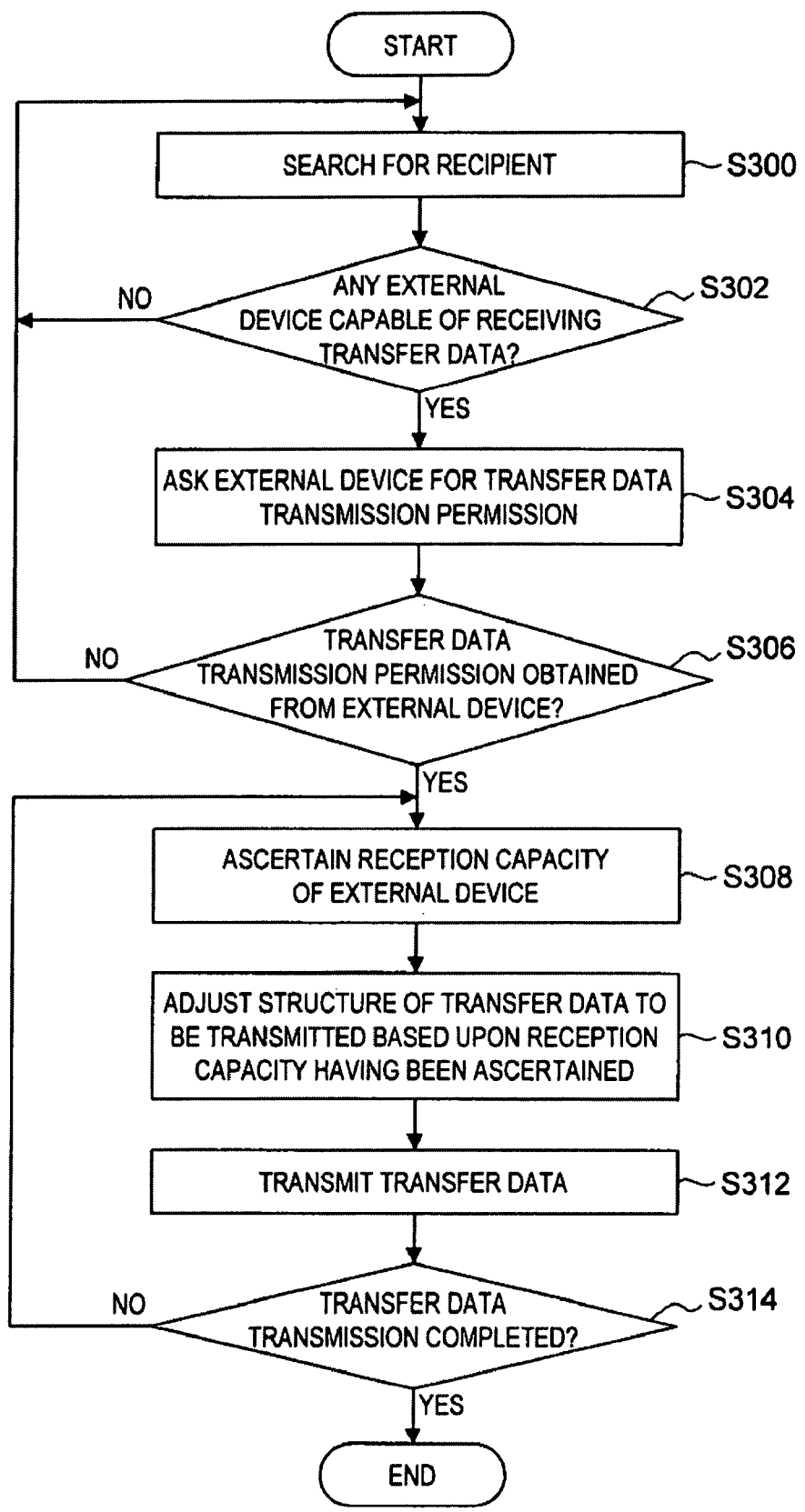

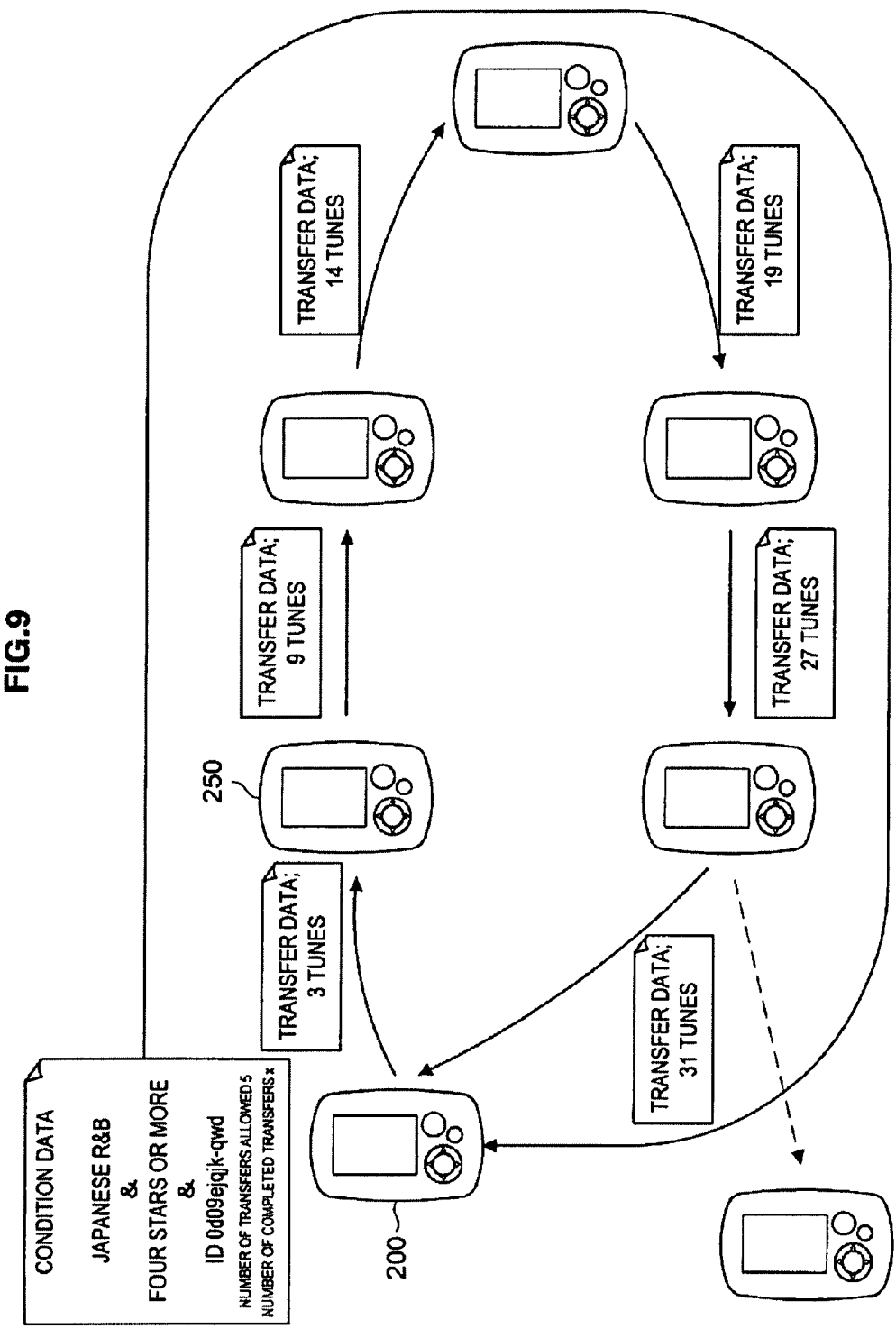

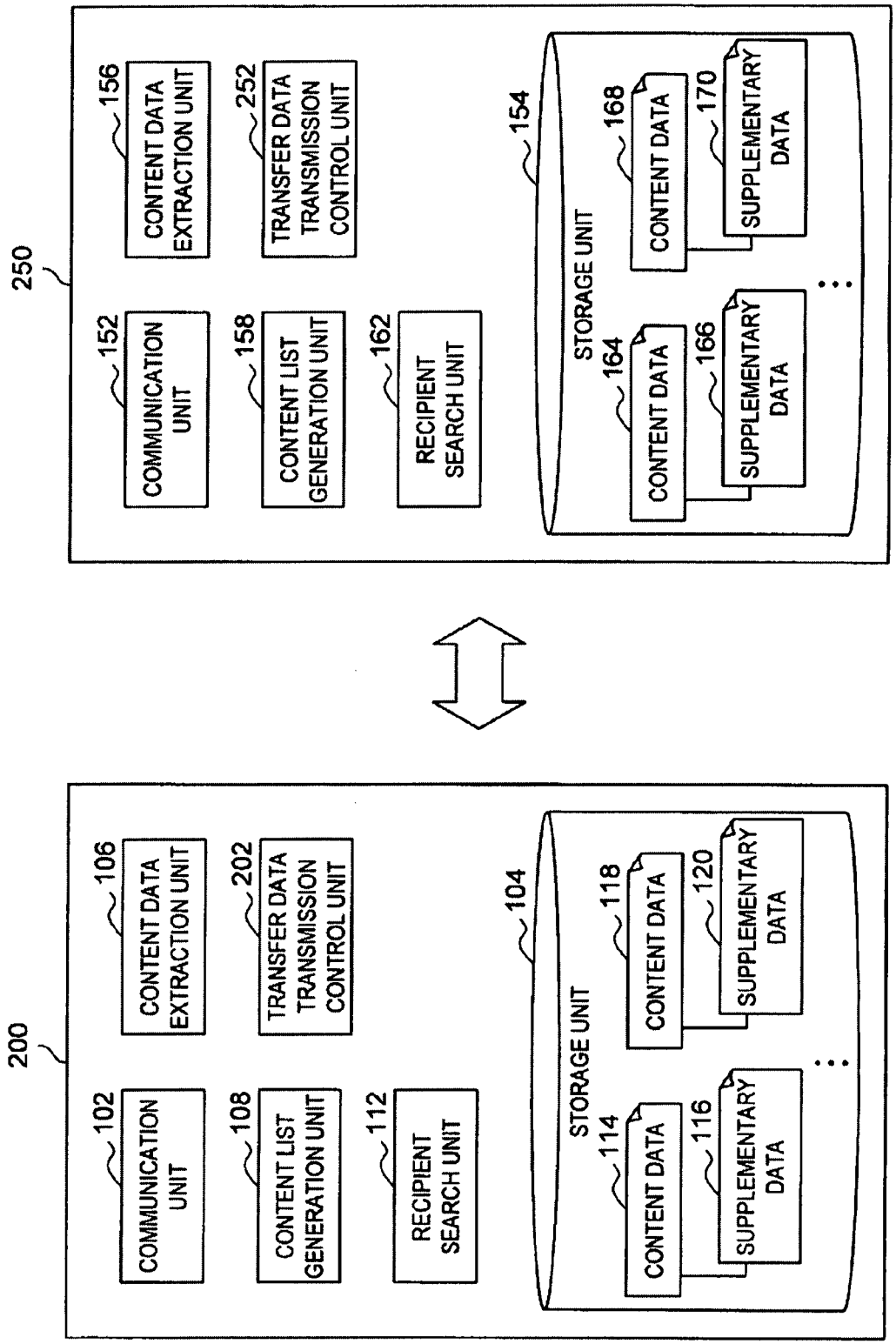

CONTENT DATA RECORDING/REPRODUCING DEVICE, INFORMATION COMMUNICATION SYSTEM, CONTENTS LIST GENERATION METHOD AND PROGRAM

CROSS REFERENCE TO RELATED APPLICATION

The present invention contains subject matter related to Japanese Patent Application JP 2006-315930 filed in the Japan Patent Office on Nov. 22, 2006, the entire contents of which are incorporated herein by reference.

BACKGROUND OF THE INVENTION

1. Field of the Invention

The present invention relates to a content data recording/reproducing device, an information communication system, a contents list generation method and a program.

2. Description of the Related Art

Today, content data such as audio files recorded in audio formats including MP3 (Moving Picture Experts Group phase-1 audio layer-3) and ATRAC (Adaptive Transform Acoustic Coding) and dynamic image files recorded in dynamic image formats including WMV (Windows Media Video) and H.264/MPEG-4 AVC (H.264/Moving Picture Experts Group phase-4 advanced video coding) are commonly and widely used. In many cases the user of the content data enjoys the content data on an information processing device such as a PC (personal computer) in which the content data are stored or on a content data recording/reproducing device where the content data are stored in a magnetic recording medium such as a hard disk or a nonvolatile memory such as a flash memory.

In addition, it is a routine practice for a majority of content data users to manage content data stored in PCs and content data recording/reproducing devices by using a contents list created for purposes of content data management. There have been technologies developed to enable integrated management of content data stored in a plurality of devices in conjunction with the use of the contents list. The technologies having been proposed to enable integrated management of content data stored in a plurality of devices include that disclosed in patent reference literature 1.

The content data user who now routinely uses the contents list to manage content data often shares the contents list or information related to the content data with other content data users by publishing the contents list of his content data or introducing favorite content data on, for instance, his homepage. Through such sharing, the content data user is able to obtain the contents list compiled for another user or information related to the other user's content data on the other user's homepage or the like and is able to refer to the information thus obtained when purchasing content data or the like.
(Patent Reference Literature 1)
Japanese Laid Open Patent Publication No. 2005-56343

SUMMARY OF THE INVENTION

However, it is a prerequisite in the technologies proposed in the related art to enable integrated management of content data stored in a plurality of devices that a one-to-one correspondence be assumed between an owner of content data and a contents list that can be used by the owner. Namely, while the content data owner is able to use a common content data list in conjunction with a plurality of devices belonging to himself, he cannot use a contents list corresponding to content data in a device owned by another user or information related to such content data. This means that the technologies proposed in the related art to enable integrated management of content data stored in a plurality of devices do not allow content data-related information to be shared with other users.

In addition, the content data user in the related art cannot obtain content data-related information he desires unless he actively seeks a contents list of another user or content data-related information pertaining to the content data belonging to the other user on the other user's homepage or the like and actively selects the information he wants.

Accordingly, the present invention having been completed by addressing the issues discussed above provides a content data recording/reproducing device, an information communication system, a contents list generation method and a program, which allow a contents list to be generated based upon conditions for acquiring desired content data-related information and allow a plurality of content data users to share the content data-related information.

According to an embodiment of the present invention, there is provided a content data recording/reproducing device, comprising a communication unit that engages in communication with an external device, a storage unit that stores content data and additional data related to the content data, a content data extraction unit that selectively extracts the content data from the storage unit based upon condition data received at the communication unit from the external device and the additional data stored in the storage unit, and a contents list generation unit that generates a contents list based upon the condition data and additional data corresponding to the content data extracted by the content data extraction unit.

The content data recording/reproducing device may comprise a communication unit, a storage unit, a content data extraction unit and a contents list generation unit. The communication unit, which engages in communication with an external device, is able to receive condition data related to generation of a contents list from, at least, the external device. The storage unit is capable of storeing content data and additional data added to the content data to characterize the content data. The content data extraction unit is capable of selectively extracting content data from the storage unit based upon the condition data received at the communication unit from the external device and the additional data stored in the storage unit. The contents list generation unit is capable of generating a contents list based upon the condition data and additional data corresponding to the content data extracted by the content data extraction unit. The structure adopted in the content data recording/reproducing device makes it possible to generate a contents list satisfying conditions set for acquiring desired content data-related information.

According to the embodiment of the present invention described above, a contents list satisfying the conditions for acquiring desired content data-related information is generated so as to allow content data-related information to be shared by a plurality of content data users.

BRIEF DESCRIPTION OF THE DRAWINGS

FIG. 7 shows the structures that may be assumed in transfer data in the embodiment of the present invention;

FIG. 8 presents a flowchart of the processing executed by adopting the second transfer data transmission method in the first embodiment of the present invention;

FIG. 9 schematically illustrates the information communication system achieved in a second embodiment of the present invention;

FIG. 10 is a block diagram corresponding to part of the information communication system achieved in the second embodiment of the present invention;

DETAILED DESCRIPTION OF THE PREFERRED EMBODIMENTS

Figure 1:
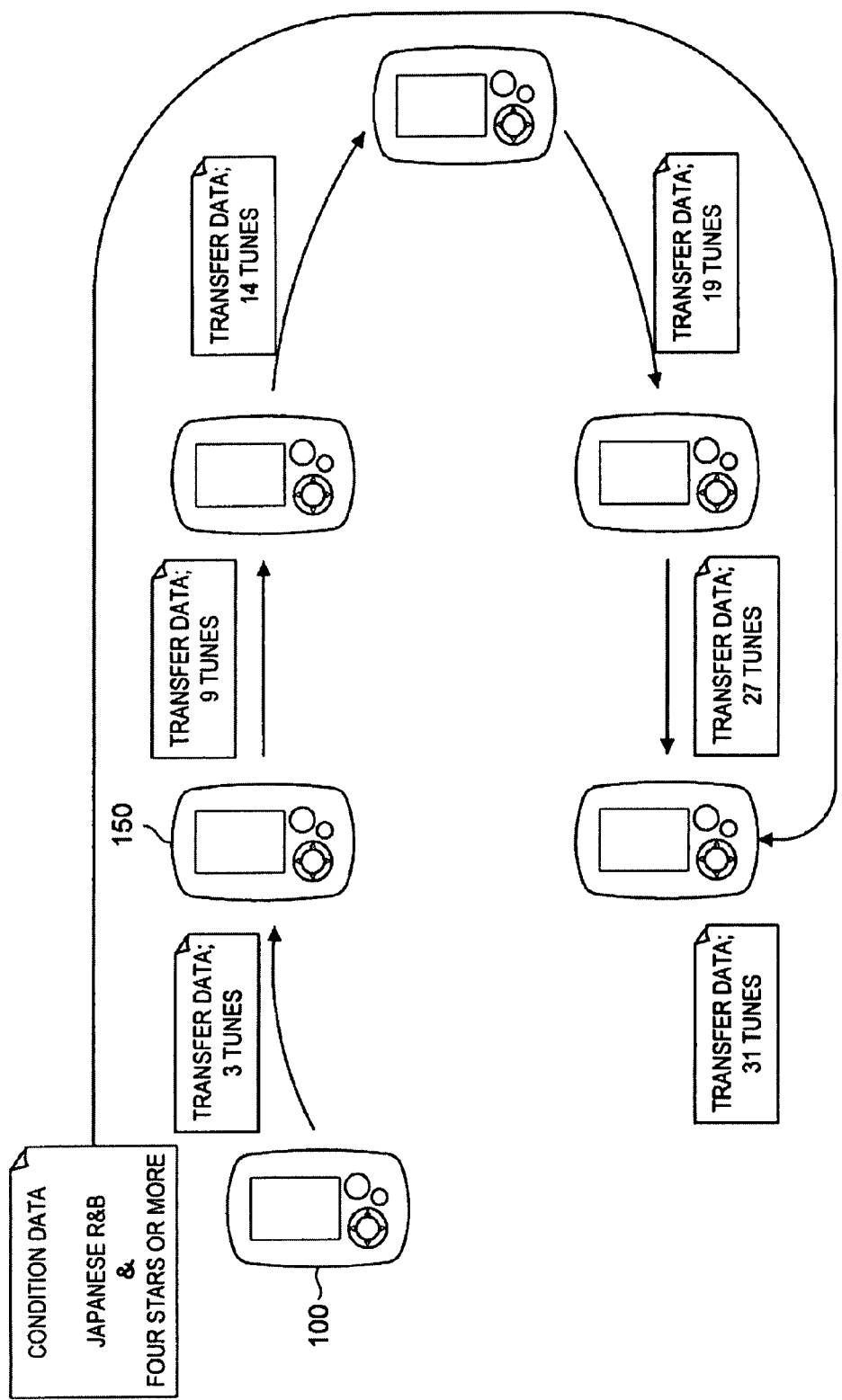
FIG. 1 schematically illustrates the information communication system achieved in a first embodiment of the present invention.

Hereafter, preferred embodiments of the present invention will be described in detail with reference to the appended drawings. Note that in this specification and the appended drawings, structural elements that have substantially the same functions and structures are denoted with the same reference numerals and a repeated explanation of these structural elements is omitted.

First Embodiment

FIG. 1 schematically illustrates the configuration of the information communication system achieved in the first embodiment of the present invention. Transfer data transmission/reception executed in the information communication system in the first embodiment is first briefly explained in reference to FIG. 1. It is to be noted that while the content data described in the following explanation are audio files in the MP3 format, the ATRAC format or the like, content data other than audio files, e.g., dynamic image files in, for instance, the WMV format or the MPEG format, may be handled in the embodiment of the present invention.

FIG. 1 illustrates a situation in which condition data indicating a content data genre "Japanese R&B" and a rating "four stars or more" with regard to content data reproduction frequency have been transmitted from a content data recording/reproducing device 100 and information related to content data satisfying the conditions indicated in the condition data is transmitted/received as transfer data among content data recording/reproducing devices. It is to be noted that while FIG. 1 shows the condition data and the transfer data exchanged among the content data recording/reproducing devices as separate entities, it will be obvious that the condition data and the transfer data may instead be incorporated as a single body of data.

As the condition data are sequentially transmitted from the content data recording/reproducing device 100 (first content data recording/reproducing device) to a content data recording/reproducing device 150 (second content data recording/reproducing device), from the content data recording/reproducing device 150 (second content data recording/reproducing device) to the next content data recording/reproducing device (third content data recording/reproducing device) and so forth, the volume of the content data-related information included in the transfer data gradually increases, e.g., from information corresponding to three tunes to information corresponding to nine tunes, to information corresponding to 14 tunes, . . . , to information corresponding to 27 tunes and then to information corresponding to 31 tunes. The information communication system achieved in the first embodiment of the present invention shown in FIG. 1 may be better understood by visualizing, for instance, a magnet attracting iron filings, with the magnet being the condition data and the iron filings being the content data-related information with the volume of content data-related information in the transfer data gradually increasing over time.

As described above, the content data recording/reproducing devices each add information related to the content data it stores based upon the condition data having been obtained in the information communication system achieved in the first embodiment of the present invention. Thus, the information communication system achieved in the first embodiment of the present invention allows each content data recording/reproducing device to generate a contents list satisfying the conditions for acquiring desired content data-related information indicated in the obtained condition data and thus enables transfer data sharing among a plurality of content data recording/reproducing devices. The following is a more detailed explanation of the information communication system achieved in the first embodiment of the present invention.

Figure 2:
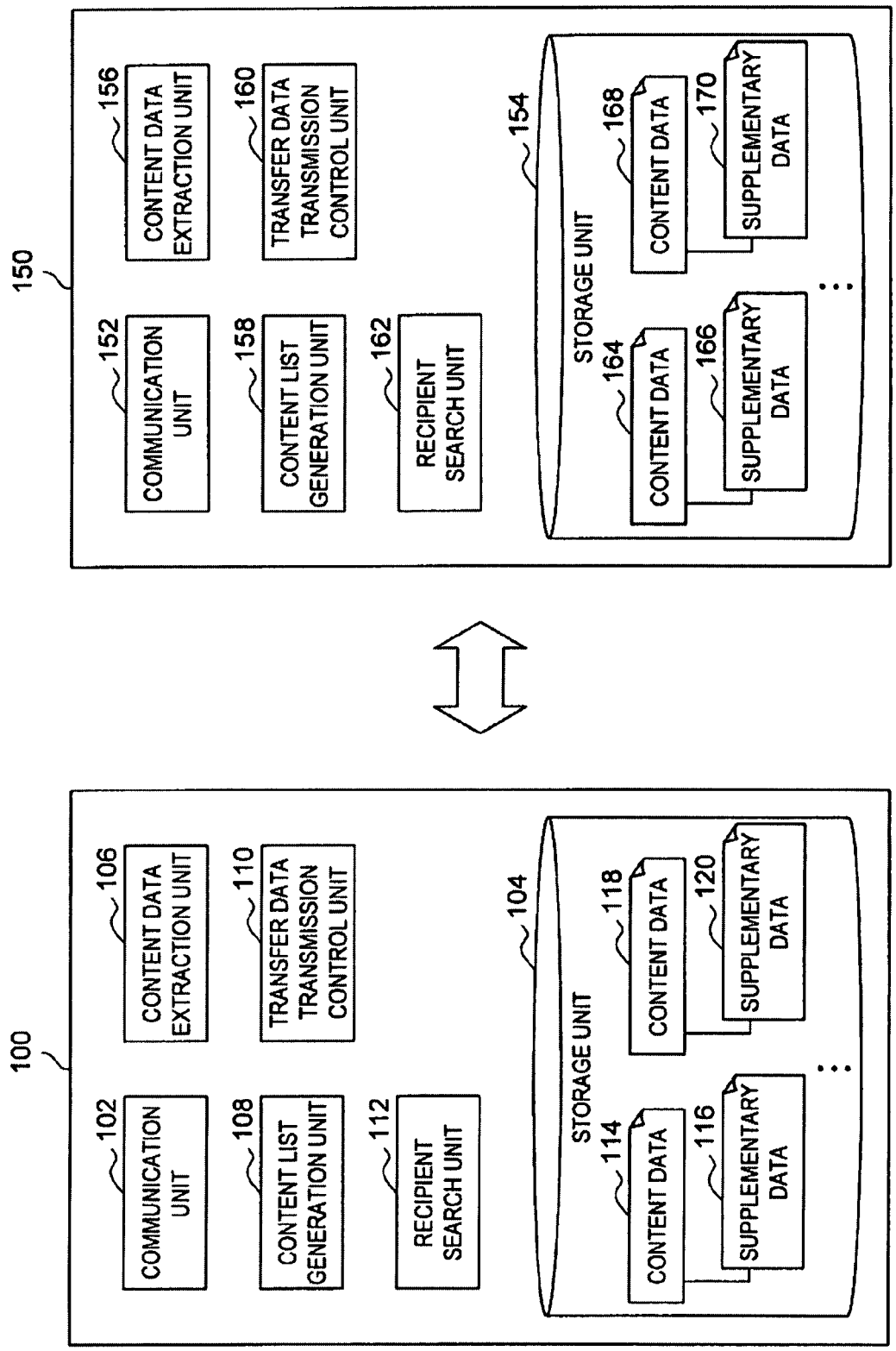
FIG. 2 is a block diagram corresponding to part of the information communication system achieved in the first embodiment of the present invention.

FIG. 2 is a block diagram corresponding to part of the information communication system achieved in the first embodiment of the present invention. As shown in FIG. 2, the information communication system in the first embodiment of the present invention includes at least the content data recording/reproducing device 100 and the content data recording/reproducing device 150.

The content data recording/reproducing device 100 includes, at least, a communication unit 102, a storage unit 104, a content data extraction unit 106, a contents list generation unit 108, a transfer data transmission control unit 110 and a transmission recipient search unit 112. The content data recording/reproducing device 100 may further include a control unit (not shown) equipped with a CPU (central processing unit) (not shown), a data holder (not shown) such as a register, a RAM (random access memory), a ROM (read only memory) or a nonvolatile memory, and the like, which executes overall control of the content data recording/reproducing device 100, an operation unit (not shown) through which instructions to the control unit are provided, a display unit (not shown) at which content data-related information can be displayed, a content data reproduction unit (not shown) engaged in operation related to content data reproduction and the like.

The communication unit 102 may be a terminal such as a USB (universal serial bus) terminal or an IEEE 1394-standard terminal, or a LAN (local area network) terminal, which physically connects with the content data recording/reproducing device 150, or it may be a unit to wirelessly engage in communication with the content data recording/reproducing device 150 by using a WUSB (wireless universal serial bus), an IEEE 802.11 (also called an "WiFi"), Bluetooth® or the like.

The storage unit 104 is used as a data holder of the content data recording/reproducing device 100, in which content data, such as content data 114 and content data 118 can be stored. In addition, supplementary data 116 and supplementary data 120 are respectively bundled with the content data 114 and the content data 118. The term "supplementary data" in this context refers to data that characterize the content data with which the supplementary data are bundled. While the supplementary data may include content data-related information such as the content data track number (Track), the artist name (Artist) the album title (Album), containing the content data, the genre (Genre), the number of content data reproductions, the rating (Rating), the date on which the content data went on sale and the content data album jacket image, another type of supplementary data may be used. It is to be noted that the supplementary data may be considered to be synonymous with additional data provided in relation to content data.

The storage unit 104 may be constituted with a magnetic recording medium such as a hard disk or magnetic tape, a nonvolatile memory such as a flash memory, an MRAM (magnetoresistive random access memory), an Fe RAM (ferroelectric random access memory) or a PRAM (phase change random access memory) or a magneto-optical disk.

The content data extraction unit 106 selectively extracts content data from the storage unit 104 based upon condition data indicating conditions related to contents list generation and the supplementary data stored in the storage unit 104. For instance, if a genre "classical" has been set as the supplementary data characterizing the content data 114, a genre "Japanese R&B" has been set as the supplementary data characterizing the content data 118 and a condition specified in the condition data is the genre "classical", the content data 114 are extracted. The condition data may be obtained from an external device via the communication unit 102 or they may be entered through the operation unit (not shown) of the content data recording/reproducing device 100. It is to be noted that while a specific genre is set in the condition data in the example described above, the condition data achieved in the embodiment of the present invention may indicate a condition other than a genre. For instance, the condition data in the embodiment of the present invention may indicate a specific condition among the rating, the issuance date, the artist name, the tempo and the mood or the condition data in the embodiment of the present invention may indicate multiple conditions in combination. If the condition data indicate multiple conditions among those listed above in a combination, more rigorous content data extraction restrictions are imposed compared to the content data extraction restrictions imposed in conjunction with a single condition indicated in the condition data. With the conditions set as described above in the condition data, the content data recording/reproducing device 100 is able to generate various contents list.

Figures 3, 4:
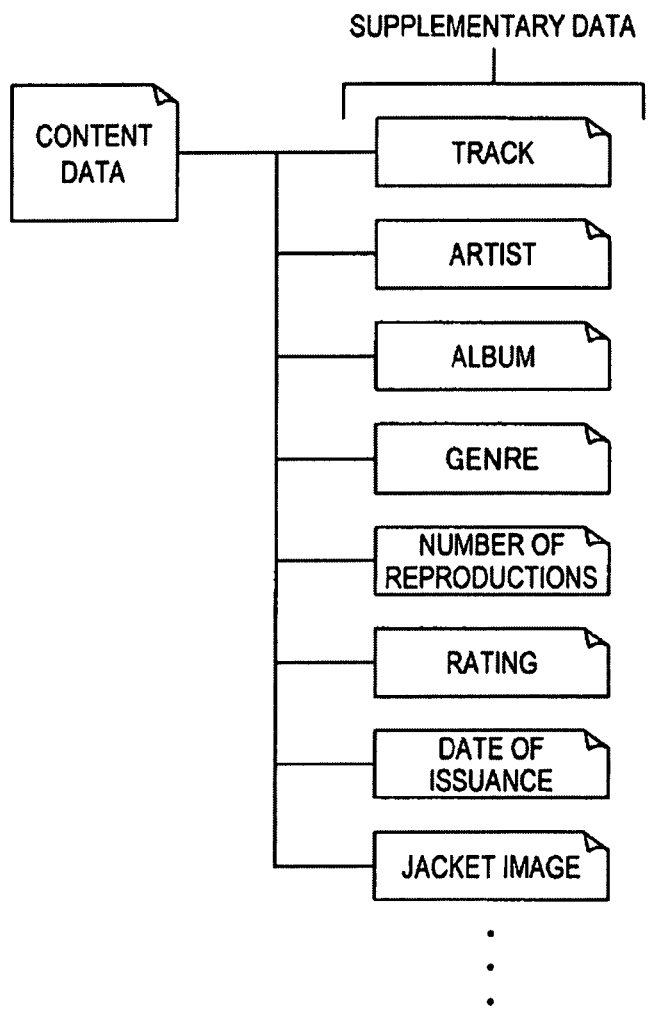
FIG. 3 provides an illustration in reference to which the supplementary data achieved in the embodiment of the present invention are to be explained.
FIG. 4 presents an example of a contents list that may be generated in the embodiment of the present invention.

The contents list generation unit 108 generates a contents list based upon the condition data and the supplementary data corresponding to the content data extracted by the content data extraction unit 106. The contents list generation unit 108 may generate a contents list such as that shown in FIG. 4. FIG. 4 shows an example of a contents list that may be generated in the embodiment of the present invention based upon condition data indicating the genre "Japanese R&B". It is to be noted that while the categories of information carried in the contents list in FIG. 4 as the contents list information include the track number (Track) the artist name (Artist), the genre (Genre) and the album jacket image, it will be obvious that the contents list may assume a structure other than this.

In addition, if a contents list upper limit value defining the upper limit to the number of entries in the contents list is set in the condition data and the number of entries in the generated contents list exceeds this contents list upper limit value, the contents list generation unit 108 resets conditions and regenerates a contents list based upon the adjusted conditions. It is to be noted that the method adopted when generating the contents list is to be described in detail later.

The transfer data transmission control unit 110 transmits transfer data that include the condition data received at the communication unit 102 from the external device (or the condition data indicating conditions entered via the operation unit (not shown)) or the condition data indicating the conditions having been reset by the contents list generation unit 108 and the contents list generated by the contents list generation unit 108. The transmission recipient search unit 112 searches for and determines the transmission recipient of the transfer data. The content data recording/reproducing device 100 equipped with the transmission recipient search unit 112 is able to first identify the transmission recipient of the transfer data being transmitted and then transmit the transfer data. It is to be noted that the method adopted when transmitting the transfer data is to be described later.

The content data recording/reproducing device 150 may adopt a structure similar to that of the content data recording/reproducing device 100. Namely, the content data recording/reproducing device 150 includes, at least, a communication unit 152, a storage unit 154, a content data extraction unit 156, a contents list generation unit 158, a transfer data transmission control unit 160 and a transmission recipient search unit 162. The content data recording/reproducing device 150 may further include a control unit (not shown) equipped with a CPU (not shown), a data holder (not shown) such as a register, a RAM a ROM or a nonvolatile memory, and the like, which executes overall control of the content data recording/reproducing device 150, an operation unit (not shown) through which instructions to the control unit are provided, a display unit (not shown) at which content data-related information can be displayed, a content data reproduction unit (not shown) engaged in operation related to content data reproduction and the like.

The communication unit 152 has structural features and functions corresponding to those of the communication unit 102 at the content data recording/reproducing device 100. For instance, if the communication unit 102 at the content data recording/reproducing device 100 is a USB terminal, the communication unit 152, too, should be a USB terminal, whereas if the communication unit 102 at the content data recording/reproducing device 100 is a terminal in compliance with the IEEE 1394 standard, the communication unit 152, too, should be a terminal in compliance with the IEEE 1394 standard. In either case, the communication unit 102 at the content data recording/reproducing device 100 and the communication unit 152 are physically connected with each other. If, on the other hand, the communication unit 102 at the content data recording/reproducing device 100 has a function of carrying out WUSB communication, the communication unit 152, too, should have a function of carrying out WUSB communication and, in this case, the communication unit 102 at the content data recording/reproducing device 100 and the communication unit 152 are wirelessly connected with each other.

The storage unit 154 is used as a data holder of the content data recording/reproducing device 150, in which content data such as content data 164 and content data 168 can be stored.

In addition, supplementary data 166 and supplementary data 170 are respectively bundled with the content data 164 and the content data 168.

The content data extraction unit 156 selectively extracts content data from the storage unit 154 based upon condition data indicating conditions related to contents list generation and the supplementary data stored in the storage unit 154. The condition data may be obtained from an external device such as the content data recording/reproducing device 100 via the communication unit 152 or they may be entered through an operation unit (not shown) of the content data recording/reproducing device 150.

The contents list generation unit 158 generates a contents list based upon the condition data and the supplementary data corresponding to the content data extracted by the content data extraction unit 156.

The transfer data transmission control unit 160 transmits transfer data that include the condition data received at the communication unit 152 from the external device (or the condition data indicating conditions entered via the operation unit (not shown)) or the condition data indicating the conditions having been reset by the contents list generation unit 158 and the contents list generated by the contents list generation unit 158. The transmission recipient search unit 162 searches for and determines the transmission recipient of the transfer data.

Part of the information communication system achieved in the first embodiment of the present invention adopts a structure described above, allowing the individual content data recording/reproducing devices to generate the contents list on their own and to share the transfer data containing the contents list. Thus, the overall information communication system achieved in the first embodiment of the present invention is enabled to execute the operation illustrated in FIG. 1.

(Contents List Generation Method Adopted in the Embodiment of the Present Invention)

Figure 5:
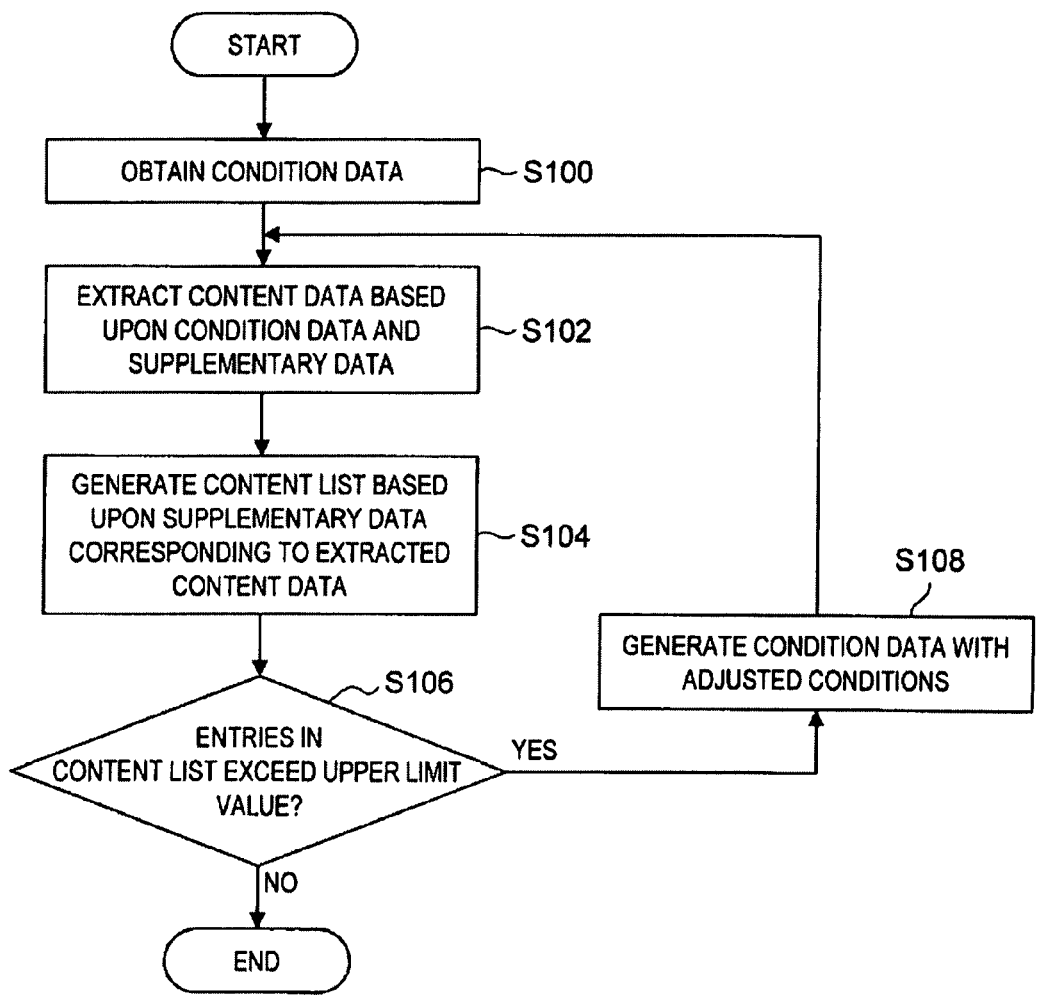
FIG. 5 presents a flowchart of the contents list generation executed in the content data recording/reproducing device in the embodiment of the present invention.

Next, the method adopted in the content data recording/reproducing devices in the embodiment of the present invention when generating a contents list is explained. FIG. 5 presents a flowchart of the contents list generation executed in each content data recording/reproducing device in the embodiment of the present invention.

The condition data are first obtained (S100). The condition data may be obtained from an external device by the content data recording/reproducing device, or a specific condition may be entered via the operation unit of the content data recording/reproducing device.

Upon obtaining the condition data in step S100, content data matching the conditions indicated in the condition data are extracted from the content data stored in the content data recording/reproducing device based upon the condition data and the supplementary data corresponding to the content data stored in the content data recording/reproducing device (S102).

Once content data are extracted in step S102, a contents list is generated based upon the condition data having been obtained in step S100 and the supplementary data corresponding to the extracted content data (S104). While the contents list shown in FIG. 4 may be generated in step S104, the structure of the contents list is not limited to that shown in FIG. 4.

A decision is made as to whether or not the number of list entries in the contents list having been generated in step S104 exceeds an upper limit value (contents list upper limit value) (S106). The upper limit value may be set in, for instance, the condition data obtained in step S100. It is to be noted that if no upper limit value is set, e.g. if no upper limit value is set in the condition data obtained in step S100, the decision may be made in step S106 by assuming that the number of entries does not ever exceed the upper limit value.

If it is decided in step S106 that the number of entries in the contents list having been generated exceeds the upper limit value, condition data are generated by resetting conditions (S108). Then, the processing is executed again starting in step S102.

The contents list generation is completed once it is decided in step S106 that the number of entries in the contents list having been generated does not exceed the upper limit value.

As described above, by adopting the contents list generation method in the content data recording/reproducing device in the embodiment of the present invention, a contents list satisfying the conditions set for acquiring desired content data-related information can be generated.

In addition, since the number of entries in the contents list is not allowed to exceed the predetermined upper limit value set for the number of contents list entries, an uncontrolled increase in the number of entries in the contents list is prevented.

(First Transfer Data Transmission Method Achieved in the First Embodiment of the Present Invention)

Figure 6:
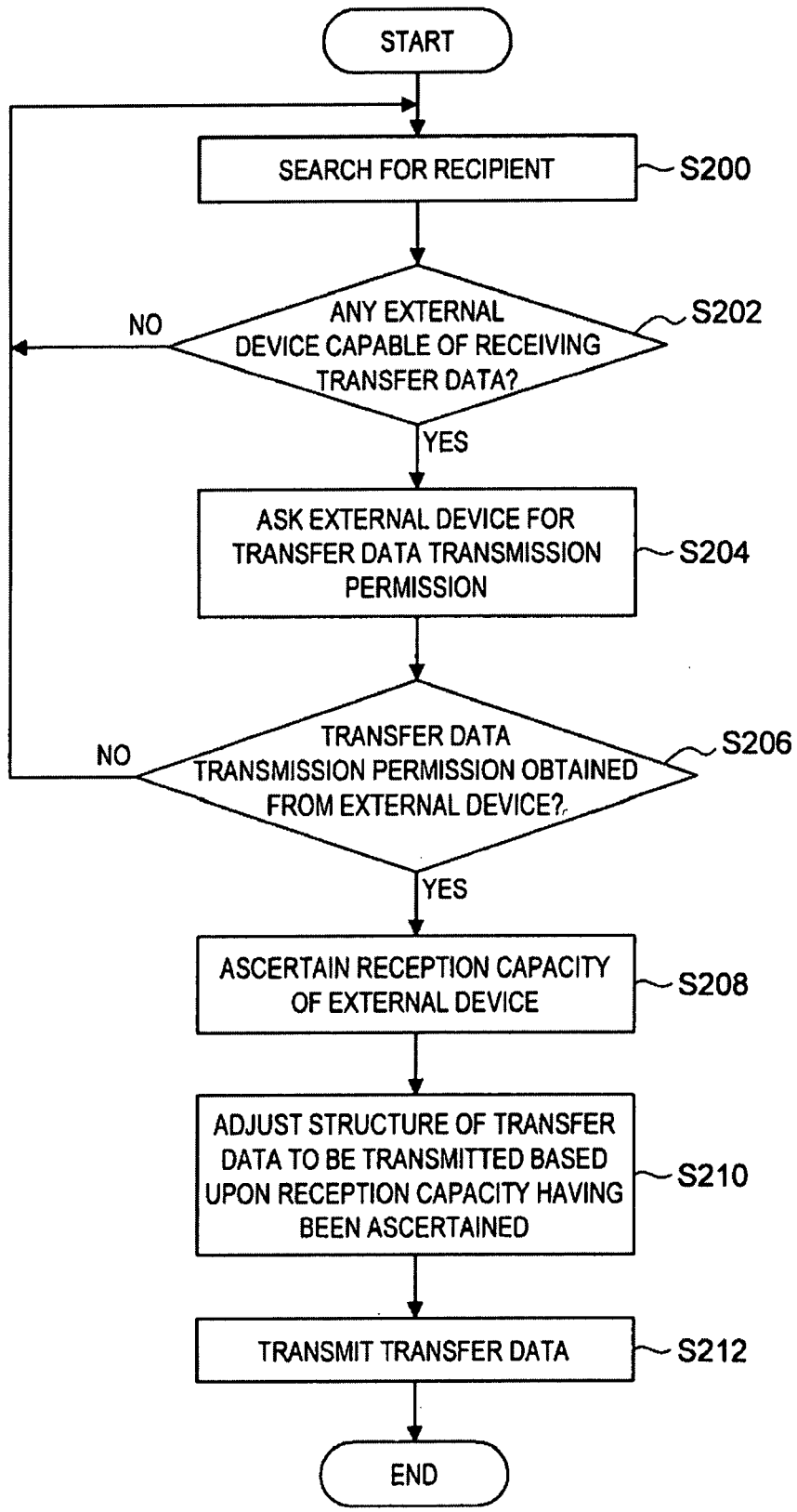
FIG. 6 presents a flowchart of the processing executed by adopting the first transfer data transmission method in the first embodiment of the present invention.

Next, a method that may be adopted in each content data recording/reproducing device in the first embodiment of the present invention when transmitting the transfer data is explained. FIG. 6 presents a flowchart of the transfer data transmission executed by adopting the first transfer data transmission method in the first embodiment of the present invention.

First, a search for transmission recipients is executed (S200). While the transmission recipient search may be executed by, for instance, transmitting a transmission request via the communication unit, the transmission recipient search may be executed by adopting another method.

A decision is then made as to whether or not there is any external device capable of receiving the transfer data (S202). The decision as to whether or not there is any external device capable of receiving the transfer data may be made in step S202 based upon the results of the search executed in step S200. In other words, the decision in step S202 may be made based upon, for instance, whether or not any external device has responded to the transmission request transmitted in step S200.

If the content data recording/reproducing device fails to find an external device capable of receiving the transfer data in step S202, the processing in step S200 is re-executed.

If, on the other hand, an external device capable of receiving the transfer data is found in step S202, the content data recording/reproducing device engages in communication with the external device to ask the external device for transfer data transmission permission (S204).

A decision is then made as to whether or not the transfer data transmission permission requested in step S204 has been granted (S206). If it is decided in step S206 that the external device has not granted the transfer data transmission permission, the processing in step S200 is executed again.

If, on the other hand, it is decided in step S206 that the transfer data transmission permission has been obtained from the external device, information indicating a transfer data reception capacity is obtained from the external device (S208). The term "reception capacity" in this context refers to the volume of data, indicated in units of bytes, which can be received and stored at the external device. It is to be noted that the reception capacity may indicate the total available data storage capacity of the storage unit at the external device or specific restrictions may be imposed with regard to the reception capacity on the external device side.

Once the information indicating the reception capacity is obtained from the external device in step S208, the structure of the transfer data is adjusted based upon the reception capacity having been ascertained (S210). The restructured transfer data may include the condition data and the contents list as shown in FIG. 7A, the condition data, the contents list and all the content data listed in the contents list, as shown in FIG. 7B, the condition data, the contents list and some of the content data listed in the content data, as shown in FIG. 7C, or the condition data contents list and samplings from all the content data listed in the contents list as shown in FIG. 7D. The sets of content data shown in FIGS. 7B through 7D may each include supplementary information (meta-information) related to the particular content data.

The variations in the transfer data structure shown in FIGS. 7A through 7D allow the transfer data to be transmitted with their volume adjusted in the transfer data transmission method in the embodiment of the present invention, which makes it possible to transmit the transfer data in a versatile manner. For instance, if the available storage capacity at the transfer data transmission recipient external device is small, the transfer data should assume the structure shown in FIG. 7A. Since the transfer data assuming the data structure shown in FIG. 7A has a smaller volume, the risk of the external device being unable to store the transfer data can be minimized. As a result, the likelihood of the transfer data being distributed to numerous content data recording/reproducing devices, as shown in FIG. 1, is increased and thus, the content data-related information can be shared among a greater number of content data users.

If the content data recording/reproducing devices in the information communication system shown in FIG. 1 all subscribe to a common subscription service, the transfer data may assume the structure shown in FIG. 7B. In this case, the content data users are able to share all the content data listed in the contents list in addition to the content data-related information such as the contents list. It is to be noted that a decision as to whether or not the content data users subscribe to the common subscription service may be made by executing a step (not shown in FIG. 6) for verifying a service subscription for the content data recording/reproducing device and each external device.

In addition, by assuming the structure shown in FIG. 7C for the transfer data, the risk of content data recording/reproducing devices subscribing to a common subscription service being unable to store the transfer data can be minimized.

The transfer data structure shown in FIG. 7D allows information provided as sample data to be shared among, for instance, content data recording/reproducing devices that do not subscribe to a common subscription service and thus, the owners of the content data recording/reproducing devices constituting the information communication system in the embodiment of the present invention are able to use the sample data for reference when purchasing content data.

It will be obvious that the transfer data may assume structures other than those shown in FIG. 7A through 7D described above. In addition, when adjusting the transfer data structure, an item of information may be deleted from the contents list. For instance, assuming that the contents list prior to the data structure adjustment is as shown in FIG. 4, the album jacket image information in the contents list in FIG. 4 may be deleted as the transfer data structure is adjusted so as to reduce the volume of data constituting the contents list. Since the volume of the transfer data is reduced, the risk of an external device being unable to store the transfer data can be further reduced. In addition, while a specific item of information in the contents list is deleted in the explanation provided above, the present invention is not limited to this example and a new item of information may be added to the contents list to provide more content data-related information in the transfer data.

Once the transfer data structure is determined in step S210, based upon the reception capacity at the external device having been ascertained, the transfer data are transmitted to the external device (S212). As the transfer data transmission is completed the transmission processing ends.

As described above, the first transfer data transmission method achieved in the first embodiment of the present invention allows the transfer data structure to be adjusted based upon the reception capacity of the transfer data transmission recipient external device. Since the first transfer data transmission method in the first embodiment of the present invention thus reduces the risk of the external device being unable to store the transfer data, the content data-related information can be shared among a greater number of content data users.

In addition, the first transfer data transmission method achieved in the first embodiment of the present invention allows the transfer data to assume diverse transfer data structures, e.g., transfer data which include the content data listed in the content data and transfer data which include some of the content data listed in the contents list. Thus, the first transfer data transmission method in the first embodiment of the present invention can be adopted under various sets of circumstances, e.g., communication carried out among content data recording/reproducing devices subscribing to a common subscription service, communication carried out among content data recording/reproducing devices that do not subscribe to a common subscription service and the like.

(Variation of the First Transfer Data Transmission Method Achieved in the First Embodiment of the Present Invention)

While the data structure assumed for the transfer data is adjusted in step S210 based upon the reception capacity of the external device ascertained in step S208 in the first transfer data transmission method achieved in the first embodiment of the present invention shown in FIG. 6, the present invention is not limited to this example and the data structure of the transfer data may be adjusted based upon, for instance, the capacity of the storage unit at the subject terminal (subject content data recording/reproducing device) instead. In this case, when receiving transfer data from an external device after transmitting transfer data to external devices from the subject terminal, the risk of being unable to receive the transfer data originating from the external device is reduced.

(Second Transfer Data Transmission Method Achieved in the First Embodiment of the Present Invention)

Next, the second data transmission method achieved in the first embodiment of the present invention is explained. FIG. 8 presents a flowchart of the transfer data transmission executed by adopting the second transfer data transmission method in the first embodiment of the present invention. While the second transfer data transmission method achieved in the first embodiment of the present invention is identical to the first transfer data transmission method achieved in the first embodiment of the present invention shown in FIG. 7 up to the point at which transmission permission is obtained from the external device having been determined as a transfer data transmission recipient through a search, the second transfer data transmission method differs from the first transfer data transmission method in the processing executed in the transfer data transmission steps.

First, a search for transmission recipients is executed (S300).

A decision is then made as to whether or not there is any external device capable of receiving the transfer data (S302). The decision as to whether or not there is any external device capable of receiving the transfer data may be made in step S302 based upon the results of the search executed in step S300.

If the content data recording/reproducing device fails to find an external device capable of receiving the transfer data in step S302, the processing in step S300 is re-executed.

If, on the other hand, an external device capable of receiving the transfer data is found in step S302, the content data recording/reproducing device engages in communication with the external device to ask the external device for transfer data transmission permission (S304).

A decision is then made as to whether or not the transfer data transmission permission requested in step S304 has been granted (S306). If it is decided in step S306 that the external device has not granted the transfer data transmission permission, the processing in step S300 is executed again.

If, on the other hand, it is decided in step S306 that the transfer data transmission permission has been obtained from the external device, information indicating a transfer data reception capacity is obtained from the external device (S308).

Once the information indicating the reception capacity is obtained from the external device in step S308, the structure of the transfer data is adjusted based upon the reception capacity having been ascertained (S310). While the transfer data structures that may be assumed for the transfer data at this point include those shown in FIG. 7, a transfer data structure other than any of these may be assumed, instead.

Once the specific transfer data structure is determined in step S310, the transfer data are transmitted to the external device (S312).

After the transfer data transmission is started in step S312, a decision is made as to whether or not the transfer data transmission has been completed (S314). If it is decided in step S314 that the transfer data transmission has not yet been completed, the processing in step S308 is executed again. Thus, in the second transfer data transmission method achieved in the first embodiment of the present invention, the transfer data structure is dynamically adjusted based upon the reception capacity of the external device ascertained while the transfer data transmission is in progress.

If it is decided in step S314 that the transfer data transmission has been completed, the transmission processing ends. The completion of the transfer data transmission occurs, for instance, when all the transmission target transfer data have been transmitted or when the volume of the transfer data exceeds the available storage capacity of the external device no matter how the data structure of the transfer data is dynamically adjusted.

As described above, the second transfer data transmission method achieved in the first embodiment of the present invention allows the transfer data structure to be dynamically adjusted based upon the reception capacity of the external device ascertained while the transfer data transmission is in progress. Since the second transfer data transmission method achieved in the first embodiment of the present invention thus reduces the risk of the external device being unable to store the transfer data, as does the first transfer data transmission method achieved in the first embodiment of the present invention, the content data-related information can be shared among a greater number of content data users.

In addition, the maximum number of sets of content data-related information can be provided in the transfer data by adopting the second transfer data transmission method achieved in the first embodiment of the present invention in which the transfer data structure is dynamically adjusted based upon the reception capacity of the external device ascertained while the transfer data transmission is in progress.

As explained above, the content data recording/reproducing devices constituting the information communication system achieved in the first embodiment of the present invention are each capable of generating a contents list based upon the condition data having been obtained, which indicate conditions set with regard to contents list generation. In addition, the content data recording/reproducing devices are each able to transmit the transfer data containing the condition data and the contents list having been generated after adjusting the transfer data structure in correspondence to the reception capacity of an external device (i.e., another content data recording/reproducing device constituting the information communication system). Consequently, the information communication system achieved in the first embodiment of the present invention in which the contents list is generated based upon the conditions set for acquiring desired content data-related information, allows a plurality of content data users to share the content data-related information.

While the content data recording/reproducing devices 100 and 150 are described above as structural elements of the information communication system achieved in the first embodiment of the present invention, the first embodiment of the present invention may instead be adopted in conjunction with, for instance, music•dynamic image recording/reproducing devices such as the "Walkman"® the trademark rights to which are stored by the applicant of the present invention, computers such as personal computers and servers, portable communication devices such as portable telephones or PHS (personal handy phone system) units and the like.

Second Embodiment

As explained above, the transfer data which include the condition data related to the contents list generation are sequentially transmitted and received among content data recording/reproducing devices, i.e., from the first content data recording/reproducing device to the second content data recording/reproducing device, then from the second content data recording/reproducing device to the third content data recording/reproducing device and so forth, in the information communication system achieved in the first embodiment of the present invention. Through this operation, a contents list satisfying the conditions set for acquiring desired content data-related information is generated based upon the conditions for acquiring desired content data-related information and the content data-related information can be shared among a plurality of content data users in the information communication system achieved in the first embodiment of the present invention. However, the information communication system achieved in the first embodiment of the present invention does not necessarily ensure that the first content data recording/reproducing device having initially transmitted transfer data is able to receive the transfer data through the sequential transmission/reception of the transfer data.

Accordingly, in the information communication system achieved in the second embodiment of the present invention explained next, the content data recording/reproducing device, from which initial transfer data originate, is able to subsequently receive the transfer data through the sequential transmission/reception of the transfer data. FIG. 9 schematically illustrates the information communication system achieved in the second embodiment of the present invention.

In FIG. 9, condition data including ID information "0d09ejqjk-qwd" to be used for content data recording/reproducing device identification and a condition related to transfer data transmission (hereafter referred to as a "transfer enable condition") indicating that the transfer data can be transmitted "five times" in addition to conditions identical to those shown in FIG. 1, i.e., the content data genre "Japanese R&B" and the rating "four stars or more" have been transmitted from a content data recording/reproducing device 200 and content data-related information satisfying the conditions indicated in the condition data is transmitted/received as the transfer data among content data recording/reproducing devices. The condition data may also include completed transfer information indicating how many times the transfer data have been transmitted. It is to be noted that this completed transfer information may indicate, for instance, the remaining number of transfers allowed for the transfer data, i.e., how many more times the transfer data may be transmitted. In addition, instead of indicating the number of times the transferred data can be transmitted, the transfer enable condition may indicate, for instance, the number of entries allowed in the contents list generated by the content data recording/reproducing devices. In such a case, as long as the number of entries in the generated contents list is fewer than the list entry setting, no restrictions are imposed with regard to the transfer data transmission.

As the condition data are sequentially transmitted from the content data recording/reproducing device 200 (first content data recording/reproducing device) to a content data recording/reproducing device 250 (second content data recording/reproducing device), from the content data recording/reproducing device 250 (second content data recording/reproducing device) to the next content data recording/reproducing device (third content data recording/reproducing device) and so forth, the volume of the content data-related information included in the transfer data gradually increases, e.g., from information corresponding to three tunes to information corresponding to nine tunes, to information corresponding to 14 tunes, . . . , to information corresponding to 27 tunes and then to information corresponding to 31 tunes, as in the information communication system achieved in the first embodiment of the present invention shown in FIG. 1. The information communication system achieved in the second embodiment of the present invention shown in FIG. 9 differs from the information communication system in the first embodiment of the present invention shown in FIG. 1 in that once the transfer data are transmitted over a number of times matching the completed transfer upper limit indicated in the transfer enable condition, the transfer data are returned to the initial transfer data sender, i.e., the content data recording/reproducing device 200 (first content data recording/reproducing device). A content data recording/reproducing device 300, which is to execute the sixth transmission of the transfer data, selects the content data recording/reproducing device 200 (first content data recording/reproducing device) instead of a content data recording/reproducing device 400 as the transfer data transmission recipient and transmits the transfer data to the content data recording/reproducing device 200 (first content data recording/reproducing device) in FIG. 9.

In this situation, the content data recording/reproducing device 300 is able to select the content data recording/reproducing device 200 based upon the ID information included in the condition data. If the content data recording/reproducing device is equipped with a communication unit constituted with a USB terminal, the ID information may be set based upon the combination of the vendor ID assigned to the USB device and the product ID. The ID information may otherwise be set in correspondence to the MAC address (media access control address) of the communication unit. However, the contents of the ID information are not limited to these examples.

As described above, the content data recording/reproducing devices each add information related to the content data it stores based upon the condition data having been obtained in the information communication system achieved in the second embodiment of the present invention, as in the information communication system achieved in the first embodiment of the present invention. Thus, the information communication system achieved in the second embodiment of the present invention allows each content data recording/reproducing device to generate a contents list satisfying the conditions indicated in the condition data and thus enables transfer data sharing among a plurality of content data recording/reproducing devices, as does the information communication system achieved in the first embodiment of the present invention.

In addition, once the transfer enable condition is no longer satisfied, the content data recording/reproducing device currently engaged in the transmission transmits the transfer data to the initial transfer data sender content data recording/reproducing device in the information communication system achieved in the second embodiment of the present invention. Thus, the information communication system in the second embodiment of the present invention allows the content data recording/reproducing device having initially transmitted the transfer data to subsequently receive the transfer data during the process of the sequential transfer data transmission/reception. The following is a more detailed explanation of the information communication system achieved in the second embodiment of the present invention.

FIG. 10 is a block diagram corresponding to part of the information communication system achieved in the second embodiment of the present invention. As shown in FIG. 10, the information communication system in the second embodiment of the present invention includes, at least, the content data recording/reproducing device 200 and the content data recording/reproducing device 250. It is to be noted that while the content data communication system in the second embodiment of the present invention adopts a structure similar to that of the content data communication system achieved in the first embodiment of the present invention, the content data recording/reproducing device 200 in the second embodiment of the present invention differs from the content data recording/reproducing device 100 in the first embodiment of the present invention in that its transfer data transmission control unit 202 engaged in transfer data transmission has a function of selectively transmitting transfer data to the initial transfer data sender content data recording/reproducing device. Likewise, the content data recording/reproducing device 250 in the second embodiment of the present invention differs from the content data recording/reproducing device 150 in the first embodiment of the present invention in that its transfer data transmission control unit 252 engaged in transfer data transmission has a function of selectively transmitting transfer data to the initial transfer data sender content data recording/reproducing device. Transfer data transmission methods that may be adopted in the content data recording/reproducing devices in the second embodiment of the present invention are explained next.

(Third Transfer Data Transmission Method Achieved in the Second Embodiment of the Present Invention)

Figure 11:
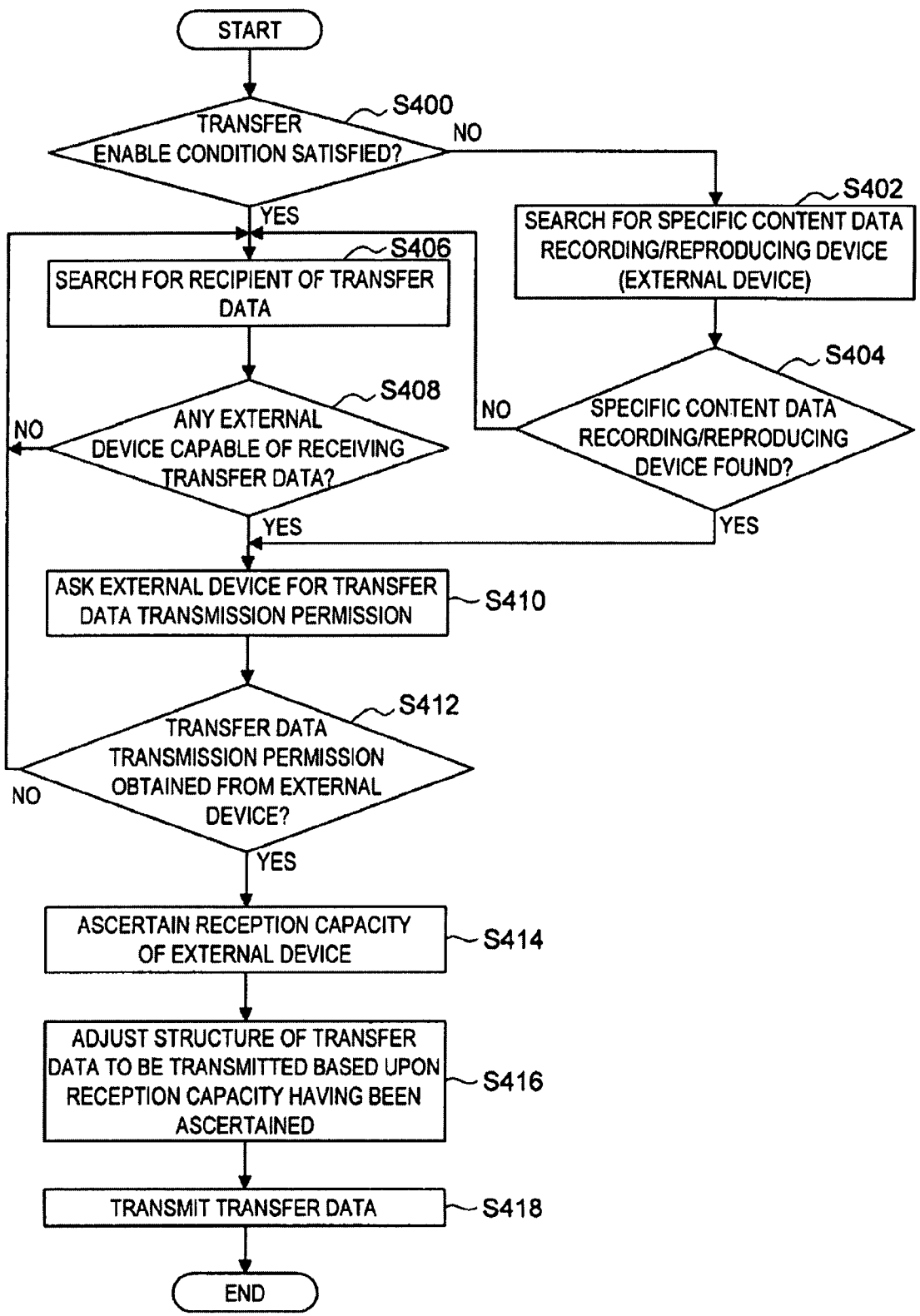
FIG. 11 presents a flowchart of the processing executed by adopting the third transfer data transmission method in the second embodiment of the present invention.

FIG. 11 presents a flowchart of the transfer data transmission executed by adopting the second transfer data transmission method in the second embodiment of the present invention. The basic flow of the transfer data transmission achieved through the third transfer data transmission method in the second embodiment of the present invention is similar to that achieved by adopting the first transfer data transmission method in the first embodiment of the present invention having been explained in reference to FIG. 6.

First, a decision is made as to whether or not the transfer enable condition is satisfied (S400). While the transfer enable condition may be the number of completed transfers indicating the number of times the transfer data can be transferred, a different restriction may be set as the transfer enable condition. In addition, if the transfer enable condition indicates the number of times the transfer data can be transferred, the decision as to whether or not the transfer enable condition is satisfied may be made based upon the number of times the transferred data can be transferred and the number of completed transfers by updating the number of completed transfers each time the transfer data are transmitted from a content data recording/reproducing device.

If it is decided in step as 400 that the transfer enable condition is not satisfied, a search for the specific content data recording/reproducing device (external device) indicated by the ID information is executed (S402) based upon the ID information included in the condition data to be used for content data recording/reproducing device identification. Then, a decision is made (S404) as to whether or not the specific content data recording/reproducing device has been found through the search executed in step S402.

If it is decided in step S404 that the specific content data recording/reproducing device has been found, the specific content data recording/reproducing device is asked to issue transfer data transmission permission (S410) as in the processing executed in steps S204 through S212 in the first transfer data transmission method shown in FIG. 6 and then a decision is made as to whether or not transmission permission has been granted (S412). If it is decided in step S412 that transmission permission has been obtained, the reception capacity at which the specific content data recording/reproducing device is able to receive transfer data is ascertained (S414) and the transfer data structure is adjusted based upon the reception capacity thus ascertained (S416). The transfer data are then transmitted (S418). Once the transfer data transmission is completed, the transmission processing ends.

If it is decided in step S400 that the transfer enable condition is satisfied, if it is decided in step S404 that the specific content data recording/reproducing device has not been found or if it is decided in step S412 that transmission permission has not been granted, a search for a transmission recipient is executed (S406) and a decision is made (S408) as to whether or not there is any external device capable of receiving the transfer data. The decision as to whether or not there is an external device capable of receiving the transfer data may be made in step S408 based upon the results of the search executed in step S406.

If the content data recording/reproducing device fails to find an external device capable of receiving the transfer data in step S408, the processing in step S406 is re-executed. If, on the other hand, an external device capable of receiving the transfer data is found in step S408, the content data recording/reproducing device engages in communication with the external device to ask the external device for transfer data transmission permission (S410).

A decision is then made as to whether or not the transfer data transmission permission requested in step S410 has been granted (S412). If it is decided in step S412 that the external device has not granted the transfer data transmission permission, the processing in step S406 is executed again.

If, on the other hand, it is decided in step S412 that transfer data transmission permission has been obtained from the external device, information indicating the transfer data reception capacity is obtained from the external device (S414) and the structure of the transfer data is adjusted based upon the reception capacity thus ascertained (S416). The transfer data are then transmitted (S418). Once the transfer data transmission is completed, the transmission processing ends.

The processing executed in steps S406 through S418 as described above is similar to that executed in steps S200 through S212 in the first transfer data transmission method shown in FIG. 6.

As described above, the third transfer data transmission method achieved in the second embodiment of the present invention allows the transfer data structure to be adjusted based upon the reception capacity of the transfer data transmission recipient external device, as does the first transfer data transmission method achieved in the first embodiment of the present invention shown in FIG. 6. Since the third transfer data transmission method in the second embodiment of the present invention thus reduces the risk of the external device being unable to store the transfer data, the content data-related information can be shared among a greater number of content data users.

In addition, the third transfer data transmission method achieved in the second embodiment of the present invention allows the transfer data to assume diverse transfer data structures, e.g., the transfer data which include the content data listed in the content data and the transfer data which include some of the content data listed in the contents list, as does the first transfer data transmission method achieved in the first embodiment of the present invention shown in FIG. 6. Thus, the third transfer data transmission method in the second embodiment of the present invention can be adopted under various sets of circumstances, e.g., communication carried out among content data recording/reproducing devices subscribing to a common subscription service, communication carried out among content data recording/reproducing devices that do not subscribe to a common subscription service and the like.

Furthermore, the third transfer data transmission method achieved in the second embodiment of the present invention allows the transfer data to be transmitted to a specific content data recording/reproducing device based upon the transfer enable condition.

(Variation of the Third Transfer Data Transmission Method Achieved in the Second Embodiment of the Present Invention)

While the data structure assumed for the transfer data is adjusted in step S416 based upon the reception capacity of the external device ascertained in step S414 in the third transfer data transmission method achieved in the second embodiment of the present invention shown in FIG. 11, the third transfer data transmission method achieved in the second embodiment of the present invention may be adopted in applications other than this. For instance, in a content data communication system adopting the third transfer data transmission method in the second embodiment of the present invention, the first content data recording/reproducing device (e.g., the content data recording/reproducing device 200 in FIG. 9) from which the initial transfer data originate may determine in advance the data structure to be assumed for the transfer data based upon the capacity of the storage unit at the subject terminal (first content data recording/reproducing device). These measures ensure that the first content data recording/reproducing device, i.e., the initial transfer data sender, having transmitted the transfer data to an external device, is less likely to be unable to receive the transfer data transmitted from an external device.

(Fourth Transfer Data Transmission Method Achieved in the Second Embodiment of the Present Invention)

Figure 12:
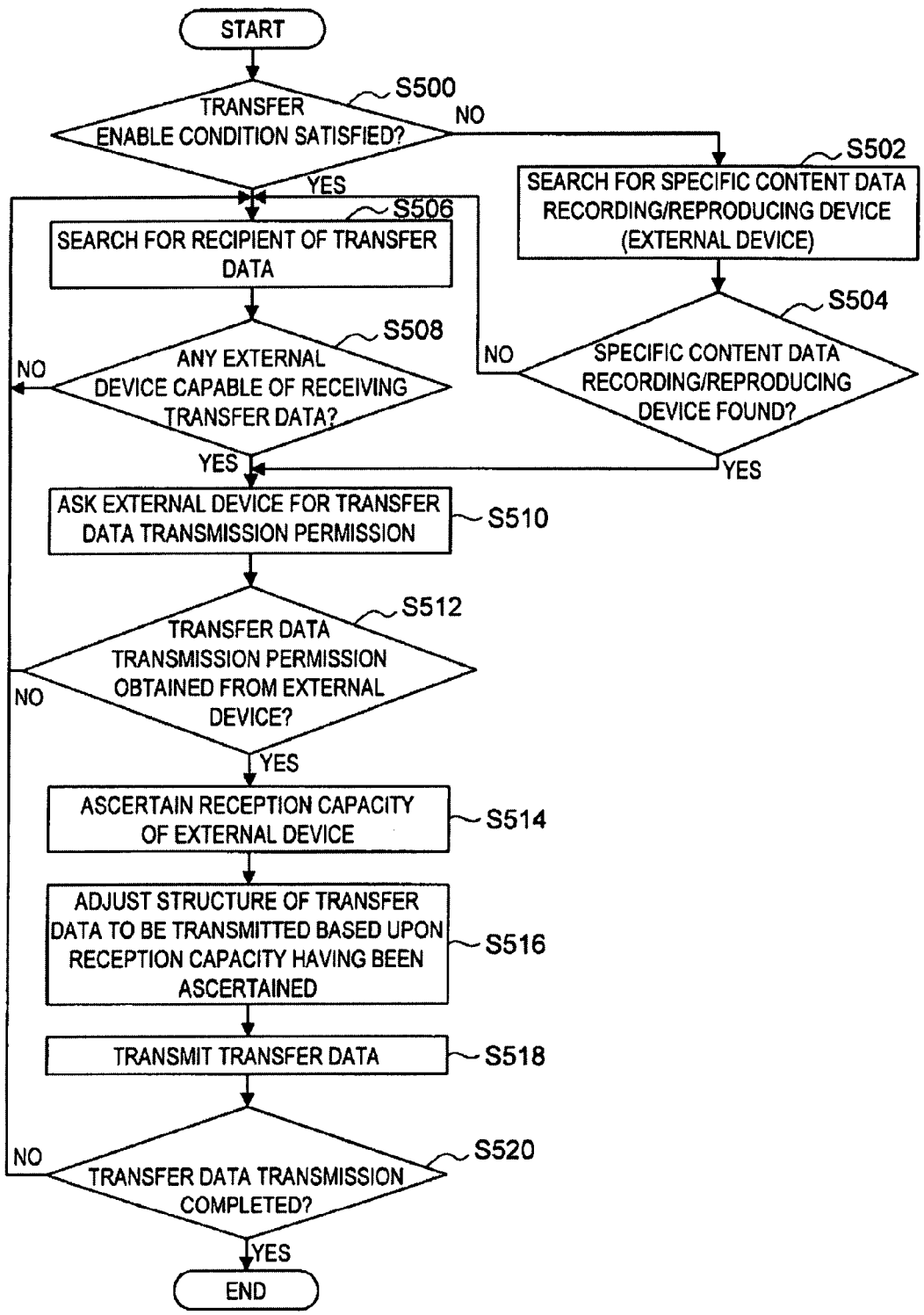
FIG. 12 presents a flowchart of the processing executed by adopting the fourth transfer data transmission method in the second embodiment of the present invention.

Next, the fourth transfer data transmission method achieved in the content data recording/reproducing device in the second embodiment of the present invention is explained. FIG. 12 presents a flowchart of the transfer data transmission executed by adopting the fourth transfer data transmission method in the second embodiment of the present invention. The basic flow of the transfer data transmission achieved by adopting the fourth transfer data transmission method in the second embodiment of the present invention is similar to that of the second transfer data transmission method achieved in the first embodiment of the present invention explained earlier in reference to FIG. 8. In other words, as in the relationship between the first transfer data transmission method and the second transfer data transmission method achieved in the first embodiment of the present invention, the fourth transfer data transmission method achieved in the second embodiment is similar to the third transfer data transmission method achieved in the second embodiment of the present invention shown in FIG. 11 up to the steps in which an external device to be designated as a transfer data transmission recipient is searched and transmission permission is obtained but differs from the third transfer data transmission method in the steps executed for the actual transfer data transmission.

First, a decision is made as to whether or not the transfer enable condition is satisfied (S500).

If it is decided in step S500 that the transfer enable condition is not satisfied, a search for the specific content data recording/reproducing device (external device) indicated by the ID information is executed (S502) based upon the ID information included in the condition data to be used for content data recording/reproducing device identification. Then, a decision is made (S504) as to whether or not the specific content data recording/reproducing device has been found through the search executed in step S502.

If it is decided in step S504 that the specific content data recording/reproducing device has been found, the specific content data recording/reproducing device is asked to issue transfer data transmission permission (S510) and then a decision is made as to whether or not transmission permission has been granted (S512), as in the processing executed in steps S304 through S314 in the second transfer data transmission method shown in FIG. 8. If it is decided in step S512 that transmission permission has been obtained, the reception capacity at which the specific content data recording/reproducing device is able to receive transfer data is ascertained (S514) and the transfer data structure is adjusted based upon the reception capacity thus ascertained (S516). The transfer data are then transmitted (S518).

After the transfer data transmission starts in step S518, a decision is made (S520) as to whether or not the transfer data transmission has been completed. If it is decided in step S520 that the transfer data transmission has not been completed, the processing in step S514 is executed again. In other words, the fourth transfer data transmission method achieved in the second embodiment of the present invention allows the transfer data structure to be dynamically adjusted based upon the reception capacity of the external device ascertained while the transfer data transmission is in progress, as does the second transfer data transmission method achieved in the first embodiment of the present invention shown in FIG. 8. Once the transfer data transmission is completed, the transmission processing ends.

If it is decided in step S500 that the transfer enable condition is satisfied, if it is decided in step S504 that the specific content data recording/reproducing device has not been found or if it is decided in step S516 that transmission permission has not been granted, a search for a transmission recipient is executed (S506) and a decision is made (S508) as to whether or not there is any external device capable of receiving the transfer data. The decision as to whether or not there is an external device capable of receiving the transfer data may be made in step S508 based upon the results of the search executed in step S506.

If the content data recording/reproducing device fails to find an external device capable of receiving the transfer data in step S508, the processing in step S506 is re-executed. If, on the other hand, an external device capable of receiving the transfer data is found in step S508, the content data recording/reproducing device engages in communication with the external device to ask the external device for transfer data transmission permission (S510).

A decision is then made as to whether or not the transfer data transmission permission requested in step S510 has been granted (S512). If it is decided in step S512 that the external device has not granted the transfer data transmission permission, the processing in step S506 is executed again.

If, on the other hand, it is decided in step S512 that transfer data transmission permission has been obtained from the external device, information indicating the transfer data reception capacity is obtained from the external device (S514) and the structure of the transfer data is adjusted based upon the reception capacity having been ascertained (S516). The transfer data are then transmitted (S518).

After the transfer data transmission starts in step S518, a decision is made (S520) as to whether or not the transfer data transmission has been completed. If it is decided in step S520 that the transfer data transmission has not been completed, the processing in step S514 is executed again. Once the transfer data transmission is completed, the transmission processing ends.

The processing executed in steps S506 through S520 as described above is similar to that executed in steps S300 through S314 in the second transfer data transmission method shown in FIG. 8.

As described above, the fourth transfer data transmission method achieved in the second embodiment of the present invention allows the transfer data structure to be dynamically adjusted based upon the reception capacity of the external device ascertained while the transfer data transmission is in progress. Since the fourth transfer data transmission method in the second embodiment of the present invention thus reduces the risk of the external device being unable to store the transfer data, as does the third transfer data transmission method achieved in the second embodiment of the present invention, the content data-related information can be shared among a greater number of content data users.

In addition, the maximum number of sets of content data-related information can be provided in the transfer data by adopting the fourth transfer data transmission method achieved in the second embodiment of the present invention in which the transfer data structure is dynamically adjusted based upon the reception capacity of the external device ascertained while the transfer data transmission is in progress.

Moreover, the fourth transfer data transmission method achieved in the second embodiment of the present invention allows the transfer data to be transmitted to a specific content data recording/reproducing device based upon the transfer enable condition, as does the third transfer data transmission method in the second embodiment of the present invention.

As explained above, the content data recording/reproducing devices constituting the information communication system achieved in the second embodiment of the present invention are each capable of generating a contents list based upon the condition data having been obtained, which indicate conditions set with regard to contents list generation, as in the information communication system achieved in the first embodiment of the present invention. In addition, the content data recording/reproducing devices are each able to transmit the transfer data containing the condition data and the contents list having been generated after adjusting the transfer data structure in correspondence to the reception capacity of an external device (i.e., another content data recording/reproducing device constituting the information communication system). Consequently, the information communication system achieved in the second embodiment of the present invention in which the contents list is generated based upon conditions set for acquiring desired content data-related information, allows a plurality of content data users to share the content data-related information.

In addition, the transfer data can be transmitted to a specific content data recording/reproducing device based upon the transfer enable condition in the information communication system in the second embodiment of the present invention, allowing the initial transfer data sender content data recording/reproducing device to receive the transfer data through the process of sequential transmission/reception of the transfer data. As a result, the owner of the initial transfer data sender content data recording/reproducing device is able to obtain information indicating content data satisfying the conditions, which belong to the owners of other content data recording/reproducing devices and is then able to use the information thus obtained when purchasing content data and the like.

While the content data recording/reproducing devices 200 and 250 are described above as structural elements of the information communication system achieved in the second embodiment of the present invention, the second embodiment of the present invention may instead be adopted in conjunction with, for instance, music•dynamic image recording/reproducing devices such as the "Walkman"® the trademark rights to which are stored by the applicant of the present invention, computers such as personal computers and servers, portable communication devices such as portable telephones or PHS units and the like as in the case of the first embodiment of the present invention.

(Contents List Generation Program)

Based upon a program enabling a computer to function as a content data recording/reproducing device in the information communication system achieved in the first or second embodiment of the present invention described above, the content data recording/reproducing devices constituting the information communication system are each able to generate a contents list satisfying the conditions set for acquiring desired content data-related information from an external device.

(Transfer Data Transmission Program)

In addition, by adjusting the data structure of the transfer data based upon the reception capacity of the transmission recipient and transmitting the transfer data assuming the adjusted data structure based upon a program enabling a computer to function as a content data recording/reproducing device in the information communication system achieved in the first or second embodiment of the present invention described above, an information communication system enabling content data-related information sharing is realized.

While the invention has been particularly shown and described with respect to preferred embodiments thereof by referring to the attached drawings, the present invention is not limited to these examples and it will be understood by those skilled in the art that various changes in form and detail may be made therein without departing from the spirit, scope and teaching of the invention.

For instance, while devices constituting the information communication systems achieved in the first and second embodiment of the present invention shown in FIGS. 1 and 9 are identical to one another, the present invention is not limited to this mode of application. For instance, it may be adopted in an information communication system that includes different types of devices, e.g., music•dynamic image recording/reproducing devices, such as the "Walkman"®, the trademark rights to which are stored by the applicant of the present invention, computers such as personal computers and servers and portable communication devices such as portable telephones and PHS units. The information communication system adopting this structure, too, achieves advantages similar to those of the information communication systems in the first and second embodiment of the present invention explained earlier.

In addition, while the content data recording/reproducing devices in FIGS. 2 and 10 each include a built-in storage unit, the present invention is not limited to this example and the storage unit may be provided as a removable storage unit that can be detachably loaded into the content data recording/reproducing device by the owner. A contents list can be generated based upon the condition data obtained by a content data recording/reproducing device with a detachable storage unit instead of a built-in storage unit in the information communication system achieved in the first or second embodiment of the present invention, and advantages similar to those of the information communication systems in the first and second embodiments of the present invention can be realized in conjunction with removable storage units as well.

It is to be noted that the functional blocks in the figures may be configured in hardware.

The structures described above simply represent examples of embodiments of the present invention and are thus obviously within the technical scope of the present invention.

What is claimed is:

1. A device, comprising:
   a storage unit that stores content data and supplementary data associated with said content data;
   a content data extraction unit that:
   identifies at least a portion of the supplementary data that corresponds to condition data received from an external device; and
   selectively extracts, from said storage unit, at least a portion of said content data that corresponds to the identified supplementary data portion; and
   a contents list generation unit that generates a contents list based upon said condition data and additional data corresponding to said content data portion.

2. The device of claim 1, wherein:
   said condition data include a contents list upper limit value defining an upper limit to the number of entries in said contents list; and
   if the number of entries in said contents list having been generated exceeds said contents list upper limit value, said contents list generation unit generates a contents list by resetting conditions in said condition data.

3. The device of claim 2, further comprising:
   a transfer data transmission control unit that transmits transfer data which includes at least one of (i) said condition data received at said communication unit from said external device, or (ii) said condition data indicating the conditions having been reset and said contents list.

4. The device of claim 3, wherein:
said transfer data transmission control unit adjusts a data structure assumed for said transfer data based upon the available storage capacity of said storage unit.

5. The device of claim 4, wherein said transfer data assumes a data structure which includes at least one of:
(a) condition data and a contents list;
(b) condition data, a contents list and all content data corresponding to said contents list;
(c) condition data, a contents list and some of content data corresponding to said contents list; or
(d) condition data, a contents list and part of each set of content data corresponding to said contents list.

6. The device of claim 5, wherein:
said condition data indicates at least one of a genre, a rating, a date of issuance, an artist name, tempo or a mood.

7. The device of claim 3, further comprising:
a transmission recipient search unit that searches for an external device capable of receiving said transfer data and designates said external device capable of receiving said transfer data as a transmission recipient.

8. The device of claim 7, wherein:
said transmission recipient search unit also obtains information indicating a reception capacity from said external device capable of receiving said transfer data; and
said transfer data transmission control unit adjusts the data structure of said transfer data based upon the reception capacity of said external device designated as the transfer data transmission recipient.

9. A device, comprising:
a storage unit that stores content data and supplementary data associated with said content data;
a content data extraction unit that:
identifies at least a portion of the supplementary data that corresponds to condition data received from an external device; and
selectively extracts, from said storage unit, at least a portion of said content data that corresponds to the identified supplementary data portion;
a contents list generation unit that generates a contents list based upon said condition data and additional data corresponding to said content data portion; and
a transfer data transmission control unit that transmits transfer data which includes said condition data and said contents list.

10. An information communication system, comprising:
a first content data recording/reproducing device, comprising:
a first communication unit that engages in communication with an external device; and
a transmission control unit that transmits condition data related to a contents list generation via said first communication unit; and
a second content data recording/reproducing device, comprising:
a second communication unit that receives said condition data;
a storage unit that stores content data and supplementary data associated with said content data;
a content data extraction unit that:
identifies at least a portion of the supplementary data that corresponds to condition data received from an external device; and
selectively extracts, from said storage unit, at least a said content data that corresponds to the identified supplementary data portion; and
a contents list generation unit that generates a contents list based upon said condition data received at said second communication unit and additional data corresponding to said content data portion.

11. A method to be adopted in a content data recording/reproducing device equipped with a storage unit that stores content data and supplementary data associated with said content data, the method comprising:
obtaining condition data related to contents list generation;
identifying at least a portion of the supplementary data that corresponds to condition data;
selectively extracting, from said storage unit, at least a portion of said content data that corresponds to the identified supplementary data portion; and
generating a contents list based upon said additional data and corresponding to said content data portion having been selectively extracted.

12. A tangible, non-transitory computer-readable recording medium having recorded therein a program enabling a computer equipped with a storage unit that stores content data and supplementary data associated with said content data to execute steps of:
obtaining condition data related to contents list generation;
identifying at least a portion of the supplementary data that corresponds to condition data;
selectively extracting, from said storage unit, at least a portion of said content data that corresponds to the identified supplementary data portion; and
generating a contents list based upon said additional data and corresponding to said content data portion having been selectively extracted.

13. The device of claim 1, further comprising a communication unit that engages in communication with the external device to receive the condition data.

* * * * *